J. T. McNALLY.
Bran-Dusters.
No. 137,228.                 Patented March 25, 1873.
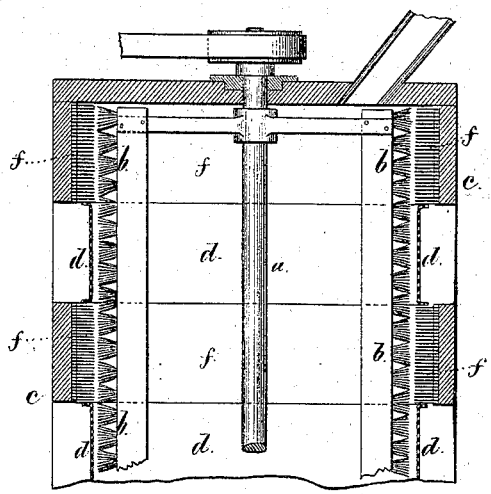
Witnesses
Chas. H. Smith
Geo. T. Pinckney
Inventor
John T. McNally,
Lemuel W. Serrell
atty.

UNITED STATES PATENT OFFICE.

JOHN T. McNALLY, OF BROOKLYN, NEW YORK.

IMPROVEMENT IN BRAN-DUSTERS.

Specification forming part of Letters Patent No. 137,228, dated March 25, 1873.

*To all whom it may concern:*

Be it known that I, JOHN T. MCNALLY, of Brooklyn, in the county of Kings and State of New York, have invented an Improvement in Bran-Dusters, of which the following is a specification:

Bran-dusters have been made with a vertical case having a fine screen, near which revolved brushes that sweep the bran across the screen, and blow the flour through such screen. This screen is very liable to be injured, because the bran requires a rubbing action to loosen the flour, and if this is done against the screen there is considerable pressure and wear.

My invention is for loosening the flour and separating the same from the bran so that the flour will be blown freely through the sieves or screens, and the bran will not be rubbed upon the screens to wear them out, but will be exposed to a rubbing and brushing action against a series of points composed of the wires in card-clothing that form sections in the interior of the case of the duster. The points of these wires, acting as brushes, are very efficient in separating the particles of flour from the bran, and they are very strong and durable.

In the drawing I have represented, by a partial vertical section, the bran-duster with my improvement applied thereto.

The shaft $a$ and brushes $b$ are of the usual character, and the case $c$ is made with fine wire cloth or screens at $d$; but instead of extending the entire length of the case $c$, the wire-cloth is in sections of suitable width, according to the size of the bran-duster, and between these sectional screens the strips of card-clothing $f$ are introduced, the wires pointing inwardly toward the brushes $b$. These alternate strips of card-clothing and wire-cloth are secured in any convenient manner to the wooden casing that is around them, and the parts are so positioned that the ends of the card teeth or wires are level with the surface of the wire-cloth, or project slightly inwardly, so as to take the wear from the brushes $b$ in brushing the bran to separate the flour.

The alternate strips of card-clothing and wire-cloth may run around the case, or lengthwise of the same, or they may be placed diagonally.

I claim as my invention—

The bran-duster, made with a case having alternate sections or strips of card-clothing or fine teeth and wire-cloth, substantially as and for the purposes set forth.

Signed by me this 20th day of September, A. D. 1872.

JOHN T. McNALLY.

Witnesses:
GEO. T. PINCKNEY,
CHAS. H. SMITH.